UNITED STATES PATENT OFFICE.

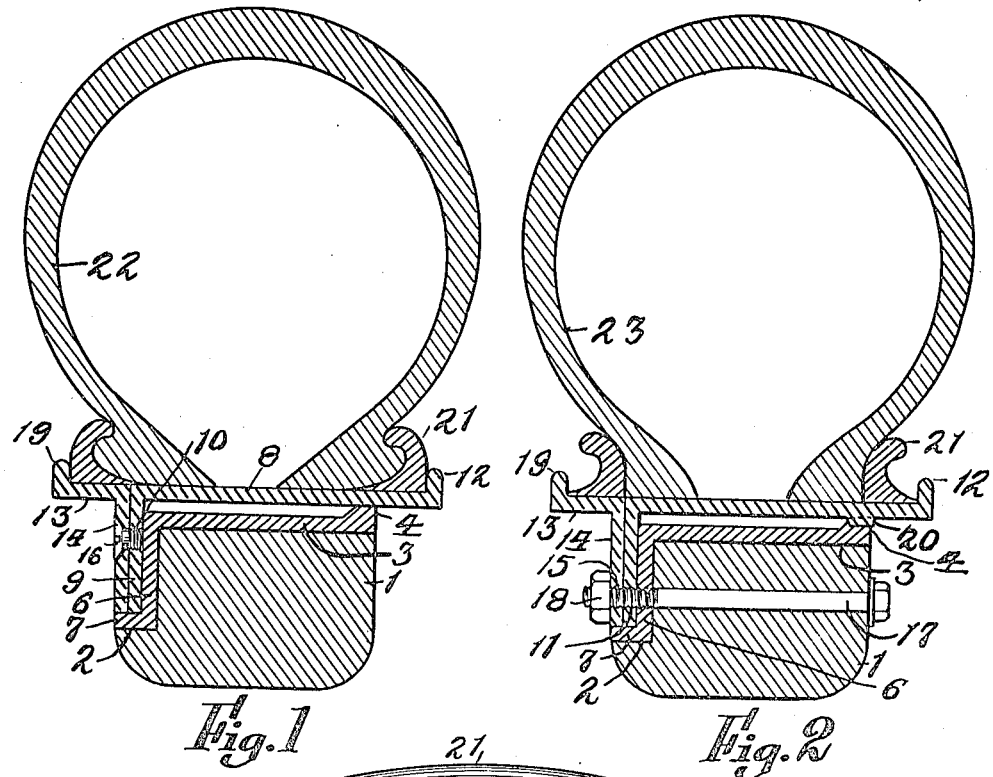
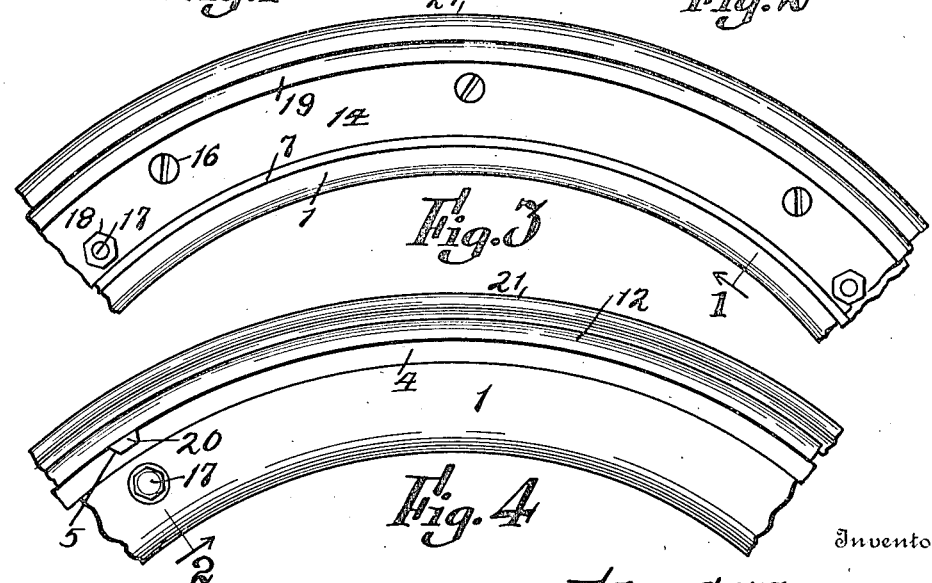

EDIE C. WALTERS, OF AKRON, OHIO.

VEHICLE-WHEEL RIM.

1,286,163.	Specification of Letters Patent.	Patented Nov. 26, 1918.

Application filed February 8, 1917. Serial No. 147,426.

*To all whom it may concern:*

Be it known that I, EDIE C. WALTERS, a citizen of the United States, residing at Akron, in the county of Summit and State of Ohio, have invented new and useful Improvements in Vehicle-Wheel Rims, of which the following is a specification.

This invention relates to vehicle wheel rims arranged to form seats for pneumatic, solid or cushion tires of elastic material, more particularly pneumatic tires of the double tube type, having contractible, inextensible or semiextensible beads or edges. The object of the invention is to provide a wheel rim of the type named for holding tires of elastic material to permit the tires to be quickly and easily placed on and removed from the rim, said rim provided with means to enable the proper seating thereon of tires of the clencher and of the straight side type, said hold fast means for the tire being removable as well as reversible to enable its use in connection with tires of either type. The invention further aims to provide a tire seating rim of the class described capable of being removed bodily from the wheel to thereby permit the removal of the rim and tire and the replacement on said wheel of a rim carrying another tire if desired, in connection with the bodily lateral removal of the rim it is contemplated that provision will be made for preventing circumferential movement of the tire carrying rim with respect to the vehicle wheel.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a cross sectional view taken on line 1 of Fig. 3 of a rim and tire holding portion of a wheel constructed in accordance with this invention, showing in section the hold fast means for seating the tire, said hold fast means arranged in operative relation with respect to a tire of the clencher type.

Fig. 2 is a cross sectional view similar to Fig. 1 taken on line 2 of Fig. 2 showing the hold fast means in operative relation with respect to another form of tire.

Fig. 3 is a view in side elevation of a portion of a wheel with the arrangement of the holding means similar to those shown in Fig. 1, and Fig. 4 is a view similar to Fig. 3 of the wheel when arranged as shown in Fig. 2 looking toward the right side of the wheel.

Referring to the drawings in detail the reference numeral 1 denotes the felly of a wheel which is provided at one side with a circumferential rabbet 2 and having a cylindrical outer face on which is mounted an annular endless felly band 3 preferably shrunk or otherwise held in position. Extending along one side and projecting outwardly from the band 3 is a circumferential or annular rib 4 which is provided at one or more places with notches 5 (see Fig. 4). The opposite side of the felly band 3 is provided with an integral inwardly turned flange 6 and having at its inner portion an integral laterally-extending cylindrical flange 7. The flanges 6 and 7 are adapted to be removably seated in the rabbet 2 of the felly 1.

Adapted to coöperate with the felly band 3 is a tire holding rim comprising an annular band 7 having an interior diameter appropriate to permit the band to seat on the circumferential rib 4 at one side of the band 3 and furthermore provided at the opposite side with an inwardly-extending annular flange 9 adapted when the rim is seated to abut against the lateral face of the flange 6 and rest on the outer face of the lateral flange 7. The inwardly-extending flange 9 is provided with a plurality of threaded apertures 10 for a purpose to be later described, and is also provided with a plurality of smooth transverse apertures 11. The side of the rim 8 opposite to the flange 9 is provided with an outwardly-projecting circumferentially-extending bead or rib 12 which constitutes an abutment for a purpose to be later described.

Adapted to coöperate with the portion 8 of the rim is a complemental member comprising an annular band 13 the internal and external diameters of which are approximately the same as similar diameters of the rim 8 and this member 13 has an inwardly-extending integral flange 14 arranged when the device is assembled to abut against the lateral face of the flange 9. This flange 14 is provided with countersunk apertures arranged to register with the threaded apertures 10 in the flange 9, and also is provided with other openings 15 adapted to register with the smooth openings 11. The flanges 14 and 9 are coupled together through the medium of screws 16. The combined flanges 9 and 14 are held in their normal position in the rabbeted portion of the felly band 3 by means of transversely-extending bolts 17 provided with the usual clamping nuts 18 so that by this means the entire rim is secured to the felly against lateral or circumferential movement. The outer lateral portion of the member 13 is provided with an outwardly-projecting and circumferentially-extending bead 19 complemental to the bead 12, formed similar therewith and also constituting an abutment for a purpose to be later described. The inner face of the rim 8 is provided with one or more inwardly-extending lugs 20 so positioned as to be receivable in the notches 5 of the rib 4 to set up an interlocking engagement for preventing any unintentional circumferential movement of the rim member 8.

Mounted on the outer face or seat of the rim members 8 and 13 are tire holding rings 21 of conventional form, and these rings 21 when they are properly disposed and positioned on the rim shown in Fig. 1 constitute hold fast means for a clencher type of tire 22, and when the position of these rings 21 is reversed as in Fig. 2 constitute hold fast means for a straight side type of tire denominated in the drawings by the reference numeral 23.

It is thought that the manner of using this device and the mounting of tires on a rim by utilizing the same will be entirely obvious to persons skilled in the art, but, it may be pointed out that if it is desired at any time to remove or replace a tire on the rim the screws 16 and the nuts 18 of the bolts 17 are removed to permit the rim forming member 13 to be withdrawn to permit lateral removal of the tire from its seat, after which a new tire can be placed thereon and the auxiliary rim member 13 secured in position by reversing the foregoing operation. If it is desired to use a different type of tire at any time, the hold fast means 21 are reversed in position as clearly indicated in the drawings thereby enabling the rim to provide a seat for tires of different types.

If it is desired to remove both the rim and tire the nuts 18 of the bolts 17 are removed and the entire rim comprising the members 8 and 13 is bodily removable laterally from its seat on the felly band 3 thus providing a demountable rim, capable of carrying a tire which can be replaced by a similar rim also carrying a tire. The provision of the lugs 20 and notches 5 prevent circumferential travel of the tire carrying rim with respect to the felly band and serve as auxiliary means for reinforcing the bolts 17 which lock the flanges 9 and 14 of the two tire carrying rim members, against circumferential movement.

From the foregoing it will be seen that the present device provides a rim capable of use as an ordinary rim wherein the tire may be removed and replaced easily and quickly, and also provides a demountable rim wherein the rim and tire may be simultaneously removed from the wheel.

I claim,

In a vehicle wheel, a felly band adapted to be permanently mounted on a felly and having an annular outwardly extending rib along one of its edges provided with a transverse notch, said felly band being provided with an inturned angular annular flange along its other edge, and a tire-carrying rim detachably mounted on said felly band having an inwardly extending annular flange adjacent one edge seated upon an angle portion of the annular felly band flange, said rim being seated on said felly band rib and provided with an inwardly extending rigid transverse lug on its inner face adjacent its other edge seated in said rib notch, substantially as and for the purpose described.

In testimony whereof I have hereunto set my hand.

EDIE C. WALTERS.